United States Patent
Johnson et al.

(10) Patent No.: US 9,278,412 B2
(45) Date of Patent: Mar. 8, 2016

(54) SUCKER ROD

(76) Inventors: Michael Eric Johnson, The Woodlands, TX (US); Donald Mike Johnson, The Woodlands, TX (US); Aleksei Averyanov, Vidnoe (RU); Viktor Smerdin, Reutov (RU)

(*) Notice: Subject to any disclaimer, the term of this patent is extended or adjusted under 35 U.S.C. 154(b) by 127 days.

(21) Appl. No.: 13/594,246

(22) Filed: Aug. 24, 2012

(65) Prior Publication Data
US 2014/0053404 A1 Feb. 27, 2014

(51) Int. Cl.
*B23P 6/00* (2006.01)
*B21D 3/00* (2006.01)
*B21C 3/18* (2006.01)

(52) U.S. Cl.
CPC ... *B23P 6/00* (2013.01); *B21C 3/18* (2013.01); *B21D 3/00* (2013.01); *Y10T 29/49238* (2015.01)

(58) Field of Classification Search
CPC ...... B08B 7/07; B08B 7/0007; B08B 7/0064; B21C 1/16; B21C 3/18; B21D 1/00; B21D 3/00; B23P 6/00
USPC .......... 29/402.04, 402.05, 888.021; 72/367.1; 134/7; 148/598; 166/176
See application file for complete search history.

(56) References Cited

U.S. PATENT DOCUMENTS

| | | | | |
|---|---|---|---|---|
| 2,103,236 A | * | 12/1937 | Coshow | 188/317 |
| 3,958,049 A | * | 5/1976 | Payne | 427/327 |
| 4,045,591 A | * | 8/1977 | Payne | 427/455 |
| 4,655,852 A | * | 4/1987 | Rallis | 148/518 |
| 7,985,938 B2 | * | 7/2011 | Johnson | 209/567 |
| 8,281,472 B2 | * | 10/2012 | Labonte et al. | 29/407.01 |
| 2010/0084322 A1 | * | 4/2010 | Johnson | 209/552 |
| 2014/0124003 A1 | * | 5/2014 | White | 134/17 |

FOREIGN PATENT DOCUMENTS

| | | | | |
|---|---|---|---|---|
| RU | 2082590 C1 | 6/1997 | | |
| RU | 2356718 | * 5/2009 | | B23P 6/00 |

OTHER PUBLICATIONS

Dover, Norris Pony Rods, Feb. 1, 2001.*
Translation for RU2356718.*
Interlloy, 4140 High Tensile Steel, all pages relevant.*

* cited by examiner

*Primary Examiner* — Alexander P Taousakis
(74) *Attorney, Agent, or Firm* — Ramey & Schwaller, LLP

(57) ABSTRACT

The disclosure relates to the treatment of rods made of metal, particularly to the method of reclamation of used standard length rods, such as pump rods already used in the mechanical deep-pumping extraction of oil, as well as to the product made with the help of the mentioned method. The method of remanufacturing of standard length rods includes the reheating of the rod body to a temperature favorable for the plastic treatment of the rod such as plastic deformation of the rod body under pressure. Such methods allow for the reclamation of rods of the desired geometric form and enhancement of the mechanical properties of the remanufactured rod. The technical outcome of the claimed invention consists in the reclamation of rods of the desired geometric form and enhancement of the mechanical properties of the remanufactured rod.

13 Claims, 1 Drawing Sheet

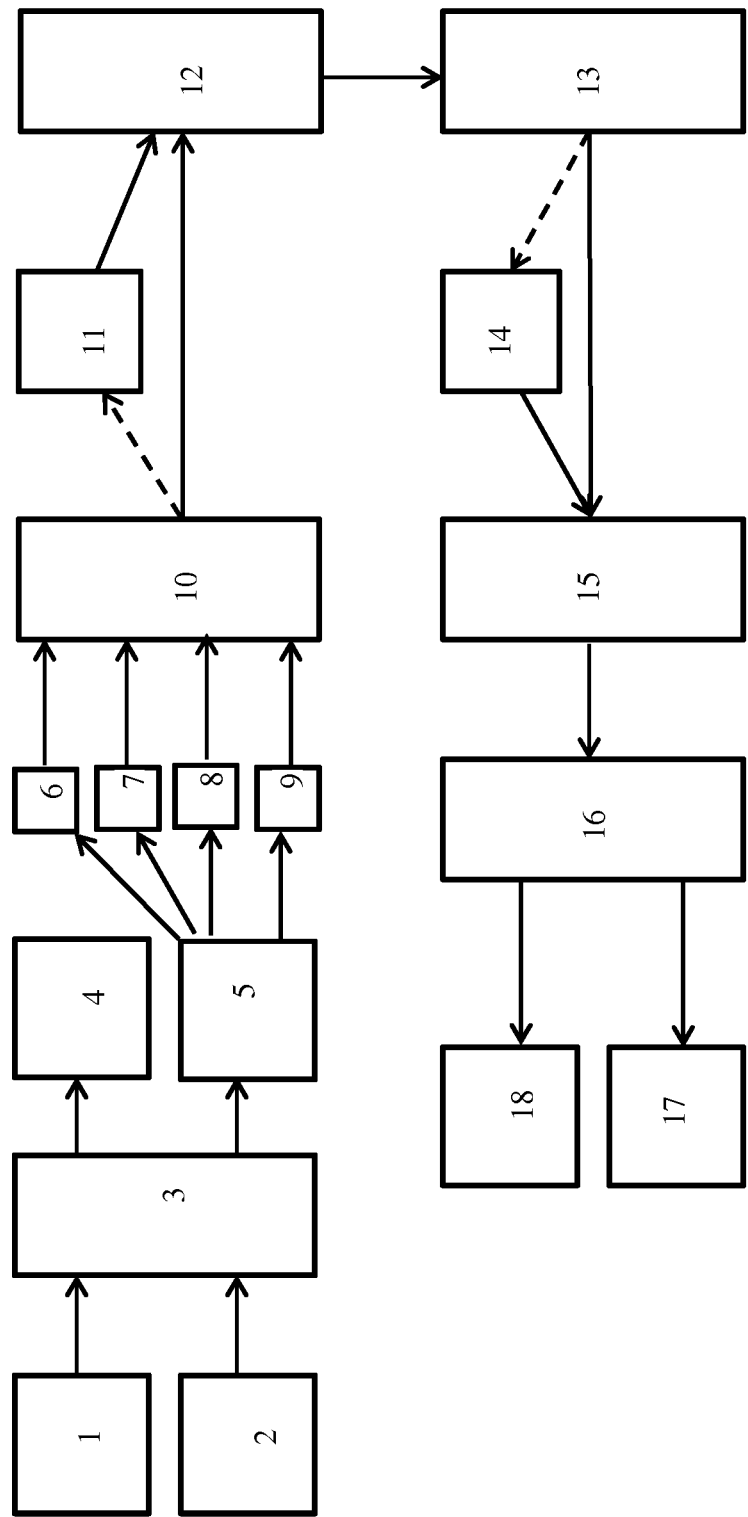

SUCKER ROD

FIELD

The embodiments of the invention disclosed herein relate to recovery of equipment used in oil production. More specifically, the embodiments of the invention relate to the methods of metal treatment, more particularly to methods of remanufacturing used standard length rods, particularly pump rods typically used in the mechanized oil deep-pumping extraction.

BACKGROUND

A sucker rod is a rigid rod used in the oil industry to join together the surface and downhole components of a reciprocating piston pump installed in an oil well. These rods are typically between 25 and 30 feet (7 to 9 meters) in length, and threaded at both ends.

Prior art discloses a method of hardening rods such as sucker rods with the help of a device with two heads that have the ability to clamp two ends of the rod in need of treatment or modification. See Russian patent RU 2082590. In this embodiment, typically one head turns uncontrollably with the rod treated along its longitudinal central line. Unfortunately, use of the aforementioned device can result in deformation of standard length sucker rods due to tension and torsion, even though cold working the rod's surface would improve the fatigue strength and the efficiency. Additionally another shortcoming of this known method lies in the fact that this device method will not reclaim the proper geometric shape of the rod and eliminate the inner stress in it, which deteriorates the quality of the remanufactured rod and its service life.

Additional methods of remanufacturing sucker rods for re-use is to eliminate the fatigue stress in the used rods by a method involving thermally treating the rods at a temperature between about 200° C. and about 650° C. for 15 to 30 minutes. It consists of normalization, upgrading or tempering, with reference to the material or rods remanufactured. After thermal treatment the rods are straightened while still hot to achieve the required straightness. Additionally, straightening while still hot allows for the removal of stress which can occur otherwise during the course of the straightening procedure.

Typically, in such implementation, the rods undergo shot peening. Shot peening is a cold working process used to produce a compressive residual stress layer and modify mechanical properties of metals. It entails impacting the surface of a metal with shot (round metallic, glass, or ceramic particles) with force sufficient to cause plastic deformation. The shot peening process used on the reclamation of sucker rods removes scale, localizes micro-cracks and improves fatigue strength.

However, the shortcomings of this aforementioned method lie in the fact that worn out or corrosion damaged rods still retain all outside geometrical form defects, even after thermal reclamation.

It would therefore be desirable to create a more efficient method for remanufacturing standard length rods such as sucker rods that would make it possible to improve the quality of the products and decrease defects as compared with the reclamation processes delivered by traditional methods.

SUMMARY

Certain embodiments of the invention pertain to a method for reconditioning a used sucker rod having a given diameter. In such embodiments the method may comprise the steps of: 1) obtaining a used sucker rod; 2) removing contaminates from the surface of the sucker rod; 3) performing a non-visual inspection of the used sucker rod to determine if the sucker rod is amenable to reconditioning; 4) categorizing the sucker rod into a steel classes; 5) heating the rod until the sucker rod is able to undergo plastic deformation; 6) shaping the rod at a temperature wherein plastic deformation occurs; 7) cooling the rod; and 8) cutting the rod into a desired length.

In embodiments pertaining to cleaning the sucker rod, the method may comprise: washing the sucker rod with an organic compound, pressure washing the sucker rod, blasting the sucker rod with dry ice, or a combination thereof. In embodiments wherein washing the sucker rod in an organic compound is contemplated, the organic compound may be kerosene.

In embodiments pertaining to a non-visual inspection of the used sucker rod, the method may comprise performing a magnetic flux leakage inspection of the sucker rod.

In embodiments pertaining to categorizing the sucker rod, the method may comprise assigning the sucker rod a steel class such as Class C steel, Class D steel, Class KD steel and High Strength steel.

In embodiments pertaining to the heating of the rod, the method may comprise heating the sucker rod to a temperature between about 900° C. and about 1300° C. Still further, said heating of the sucker rod may be accomplished by induction heating.

In embodiments pertaining to the shaping of the rod, shaping may decrease the diameter by one standard size, the standard sizes being 1", ⅞", ¾", and ⅝", and increases the length of the rod. Alternatively, shaping may decrease the diameter by more than one standard size. In either embodiment, the rod length is increased. In embodiments wherein the diameter has decreased by a single size, the rod may be cut into a shorter rod for use as a sucker rod and a pony rod. In embodiments wherein the diameter has decreased by more than one size, the rod may be cut into two or more rods for use as sucker rods.

In further embodiments, after shaping the rod, the rod is subjected to shot peening.

In further embodiments, after cutting the rod, ends are forged onto the rod to generate a new sucker rod.

In further embodiments after cutting the rod, the rod is subjected to a final inspection such as an eddy current inspection.

BRIEF DESCRIPTION OF THE DRAWINGS

FIG. 1 is a flow chart of an embodiment of a method of reconditioning sucker rods, and wherein solid arrows are generally required and dashed arrows are optional.

LIST OF REFERENCE NUMERALS collection process 1
shipment process 2
presortment 3
discarding process 4
grade sortment procedure 5
C 6
D 7
KD 8
High Strength 9
cleaning procedure 10.
rod straightening machine 11
induction furnace 12
pressure machine 13 shot peening 14
cutting procedure 15
final inspection process 16
outside manufacturer 17
factory forging 18

DETAILED DESCRIPTION

Introduction

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

As used herein, the term "sorting" means to arrange according to class, kind, and/or size; to classify.

As used herein, the term "rod" may include hollow or solid rods, continuous rods or joints, and includes welded, flanged, screwed, and other rod goods. In particular, sucker rod joints are one type of rod which may benefit from the methods described herein, but the disclosure is not so limited.

As used herein, the term "used rod" means a rod that has been in actual service for a purpose, such as transporting fluids, connecting a downhole pump to a surface driver, and the like, whether on the surface, downhole, underwater, onshore, or off-shore. In particular, in the case of sucker rods, used sucker rods are those that may be lifted to a holding area where they are uniquely identified according to size, quantity, company name and well location and tagged appropriately.

As used herein the phrase "performing non-visual, non-destructive inspection" means a technique which does not impair the rods from performing their intended function or use, and does not involve a human visual test.

It is a goal of the present invention to remanufacture standard sized rods such as sucker rods by methods which include reheating of the rod body up to a particular temperature and applying pressure in conditions favorable for plastic deformation.

Still further, it is a goal of the present invention to clean the rod devices. Following cleaning, it is a goal of the present invention to presort the rods, such as sucker rods by grade and quality. Following assortment, the methods disclosed herein contemplate cleaning the rod devices. Following cleaning, the methods disclosed herein contemplate straightening the rod devices. Following straightening the rod devices, the methods disclosed herein contemplate subjecting the rod devices to heating to the point wherein plastic deformation may occur and pressure for shaping. Following the heating process, the methods disclosed herein contemplate subjecting the rod devices to a rolling mill. Following subjecting the rod devices to a rolling mill, the methods disclosed herein contemplate straightening the rods again if necessary.

Cleaning

Typically, before inspection to sort out unacceptable rods from rods which are able to function for their intended purpose, the rods are cleaned. Typically, in most embodiments of the invention, the used rods are cleaned in a hot kerosene bath to remove paraffin, grease and other foreign materials.

However, in certain embodiments the cleaning process may be to subject the rods to pressure washing, either with water or with other solvents such as inorganic solvents such as acid baths and the like or organic solvents. Organic solvents contemplated may include benzene, ether, gasoline, acetone and the like. Further, it is contemplated that in some embodiments, the cleaning process with certain organic or inorganic solvents may not require the solvents to be blasted against the rods via pressure washing but rather the rods may be dipped, submerged, or subject to low pressure wetting of such solvents in order to clean the rods.

In other embodiments, high pressure air, high pressure inert gases such as nitrogen, or the noble gasses may be used to clean the rods of paraffin, grease and other foreign materials.

In still further embodiments, the rods may be shot blasted with sand, polystyrene, glass and the like to remove paraffin, grease and other foreign materials.

It is further contemplated that dry ice cleaning may be used. In such embodiments, the rod may be subjected to being blasted with dry ice or surrounded with dry ice in order to remove the aforementioned contaminates. A particular advantage of the use of dry ice is the lack of flammability associated with the use of organic solvents such as kerosene, acetone and the like. An additional advantage of dry ice cleaning is the lack of cleanup of the cleaning material as dry ice sublimates at room temperature and normal atmospheric pressure (1 bar). However, it may be necessary to provide adequate ventilation should workers be present in order to avoid carbon dioxide poisoning.

Once the rods are clean, typically in most embodiments of the invention, they are subjected to presortment.

Presortment

Typically, rods are collected from petroleum producing sites and brought to a central location for inspection prior to any reconditioning or remanufacturing processes. Visual inspection is typically the first step in the convention reclamation and reconditioning processes.

Typically, the process of visual inspection typically involves a person visually locating pitting, corrosion, wear, stretched rods and bent rods. Any rod which fails to pass this visual inspection may be removed from the aforementioned central location as rejected.

However, despite visual inspection, even clean rods may have unseen defects such as cracks that result in such rods being unacceptable for their intended use. Accordingly, sometimes other methods of inspection are used.

In many embodiments of the invention, the methods comprise performing non-visual or non-destructive inspection of used rods prior to any straightening as discussed below.

In order to inspect the rods in a non-visual manner, methods of the invention may include passing used rods through one or more stationary inspection stations. Alternatively one or more inspection apparatus may be moved along stationary rods. Alternatively, both the used rods and inspection apparatus may move.

In certain embodiments of the invention pertaining to non-visual inspection, magnetic flux leakage inspection may be used. Such methods typically involve the use of a magnetic coil and a detector assembly for inspecting the rods. Such systems typically employ one or more magnetic detectors adapted to be spaced a first distance from the rod member by one or more substantially frictionless members during an inspection. Methods specifically pertaining to magnetic flux leakage inspection may be found in U.S. Pat. No. 7,397,238, which is herein incorporated by reference in its entirety. In alternative embodiments of the invention, other suitable non-visual, non-destructive inspections include, but are not limited to: ultrasonic inspection, eddy current inspection, acoustic emission inspection, and the like. Furthermore, the data from such tests may be presented in one or more formats, including visual format, such as on a CRT screen, flat panel screen, printer, strip chart recorder and the like.

Additionally, in addition to the detection of flaws, the rods, in certain embodiments may be separated in to grades of steel. In such embodiments, it may be beneficial to determine the grade of the steel rod before any treatment occurs so as to know the physical constraints and properties of the end product. In such embodiments, the grades of steel are typically divided into the following: Class C steel, Class D steel, Class KD steel, and High Strength steel. Within the classes, Class D steel is typically divided by alloy D and carbon D.

Straightening

Typically, in many embodiments of the invention, rods that have not been rejected, but that are bent or still possess rod guides are sent to a rod straightening machine and/or a rod guide removal machine. Typically, in many embodiments of the invention, once the rods have been straightened and no longer have rod guides, they may be returned to the aforementioned central location.

Heating and Shaping

In certain embodiments of the invention, upon straightening of used rods, the rods are subjected to heating. In such embodiments, a rod such as a sucker rod in need of reclamation is heated to a temperature favorable for plastic deformation of the rod. In the case of steel, the temperature may be within the range of about 900° C. to about 1300° C. This temperature range is known to be used for treating steel alloys through forging, rolling, deformation and the like. Still further in implementation, at the same time the rod is being heated to a temperature favorable for plastic deformation, a hot recrystallization of the rod takes place which eliminates inner stress of the rod that has accumulated during the course of the rod's operational life.

In certain embodiments the desired geometry of the used rods is obtained by treatment under pressure. In such embodiments, the cross sectional area of the rod may be varied while the standard length of the rod is maintained. In such embodiments, mechanical properties of rods may be enhanced during the pressure treatment such that a rod is structurally stronger in its peripheral zone. For example, by the reheating the rod body up to a temperature which would allow it to undergo plastic deformation under pressure, the rod may be structurally stronger in the peripheral zone as compared to rods treated by other methods of reclamation. Additionally, the high temperature used to make the rod favorable for plastic deformation also allows the rod to be reshaped to the correct geometric form as before without any defects caused in the operations such as cracks or cavities.

In further embodiments, reheating the rod is specifically achieved through the use of an induction furnace. As is known in the art, an induction furnace is an electrical furnace in which the heat is applied by induction heating of metal. The advantage of the induction furnace is a clean, energy-efficient and well-controllable melting process compared to most other means of metal melting. Since no arc or combustion is used, the temperature of the rod can be set such that it is no higher than what is required to make it amenable to plastic deformation; this can prevent loss of valuable alloying elements. Operating frequencies range from utility frequency (50 or 60 Hz) to 400 kHz or higher, usually depending on the material being melted, the capacity of the furnace and the melting speed required. Generally, the smaller the volume of the melts, the higher the frequency of the furnace used; this is due to the skin depth which is a measure of the distance an alternating current can penetrate beneath the surface of a conductor. For the same conductivity, the higher frequencies have a shallow skin depth, in other words, that is less penetration into the melt. Lower frequencies can generate stifling or turbulence in the metal.

In still further embodiments, upon heating the used rod to a temperature favorable for plastic deformation, the used rod can be treated under pressure, typically by radial-helical rolling. As a sucker rod or pump rod is an elongated bar shape, under pressure treatment the cross-sectional diameter of the rod will decrease such that the rod can be reformed into the next smaller standard size if desired. After plastic deformation, besides shrinking the cross-sectional area, the length of the rod will be increased if the mass of the metal remains constant or near constant. Typically, the reduction in diameter is one size down in terms of standard rod size. However, reduction by several sizes would allow two sucker rods to be produced out of one parent sucker rod. The standard sizes for sucker rods in English measurements are 1", ⅞", ¾", and ⅝".

As the heating and shaping increases the length, the rods may be cut before the heating and shaping to remove the ends. Typically processed in one of two ways. In the first way, the rods may simply have the ends cut off so that the rods are cut to the correct length and the remaining steel can be used to make pony rods. Alternatively, the ends can be cut off plus additional footage in the body of the rod in order to produce new bar stock that is the length needed to produce a new sucker rod.

After treatment via plastic deformation, the rods, such as sucker rods may be raw bar stock that can be sold to users or other manufacturers in the petroleum industry. These rods can be made to a standardized length again by cold chiseling, abrasive cutting or both.

In this embodiment, the users or other manufacturers may forge the ends of the sucker rods to fit their particular equipment needs. Alternatively, an additional embodiment of the invention may be to forge the ends of the sucker rods at the location of the can be made to a standardized length again by cold chiseling, abrasive cutting or both.

Shot Peening

Upon reformation, the rod is then cooled and stored for use or further treatments.

In certain embodiments, after cooling the rod, such as a sucker rod is subjected to shot peening. Shot peening is a cold working process in which the surface is bombarded with small spherical media called shot. As each individual shot particle strikes the surface, it produces a slight rounded depression. Plastic flow and radial stretching of the surface metal occur at the instant of contact and the edges of the depression rise slightly above the original surface. Benefits obtained by shot peening are the result of the effect of the compressive stress and the cold working induced. Compressive stresses are beneficial in increasing resistance to fatigue failures, corrosion fatigue, stress corrosion cracking, and hydrogen assisted cracking. Shot peening is effective in reducing sucker rod fatigue failures caused by cyclic loading. Stress corrosion cracking cannot occur in an area of compressive stress. The compressive stresses induced by shot peening can effectively overcome the surface tensile stresses that cause stress corrosion. Shot peening has been shown to be effective in retarding the migration of hydrogen through metal. Shot peening improves the surface integrity of the sucker rod. As peening cold-works the rod surface, it blends small surface imperfections and effectively eliminates them as stress concentration points.

Final Inspection

In certain embodiments of the invention, following the sorting, cleaning, straightening, heating and shaping of the rods, the rods are subject to a final inspection. Typically such inspection is eddy current inspection. Eddy-current inspection uses electromagnetic induction to detect flaws in conductive materials. In a standard eddy current inspection a circular coil carrying current is placed in proximity to the sucker rod. The alternating current in the coil generates changing magnetic field which interacts with sucker rod and generates an eddy current. Variations in the phase and magnitude of these eddy currents can be monitored using a second receiver coil, or by measuring changes to the current flowing in the primary coil. Variations in the electrical conductivity or magnetic permeability of the test object, or the presence of any flaws, will cause a change in eddy current and a corresponding change in the phase and amplitude of the measured current.

Implementation

In implementation of the aforementioned embodiments and methods, and referring to FIG. 1, rods, hereinafter for simplicity referred to as sucker rods, are collected from upstream petroleum producing sites via a collection process 1. Alternatively, the sucker rods may be shipped to a common location via a shipment process 2. The sucker rods are then subjected to presortment 3. First, the sucker rods are scanned through non-visual magnetic flux leakage inspection to sort out flaws in the sucker rods. Sucker rods which have failed inspection are subject to a discarding process 4. Sucker rods which have not failed this inspection are subjected to a grade sortment procedure 5 to sort out the grade of steel, such as C 6, D 7, KD 8 and High Strength 9. Sucker rods which have not failed inspection due to extensive cracks or extensive corrosion, and have been sorted are then subjected to a cleaning procedure 10.

In a preferred implementation, the sucker rods, separated by grade of steel, are taken to a plant. Each grade of sucker rods is treated in turn. In the plant, the sucker rods are first cleaned.

After cleaning, each sucker rod in need of straightening is subjected to a rod straightening machine 11. After straightening, the rods are capable of being heated and shaped.

In the step of heating and shaping, each rod is placed upon a conveyor which transports each sucker rod through an induction furnace 12 or a series of induction furnaces with a temperature of between about 900° C. to about 1300° C. The heating is designed not to melt the sucker rod but to soften each sucker rod to the point wherein plastic deformation is possible.

Following heating to the point wherein plastic deformation is possible, the sucker rod is subjected to a pressure machine 13 in order to smooth out any surface imperfections. This process compresses the sucker rod such that the cross sectional area may be changed.

Upon shaping, the conveyor removes the sucker rod from the pressure machine and the sucker rod is allowed to cool. After cooling, the sucker rod may then be optionally subjected to shot peening 14. Regardless of whether the sucker rod is subjected to shot peening, the sucker rod may be optionally cut to a desired length through a cutting procedure 15. When cut to a desired length, the sucker rod is then subjected to a final inspection process 16. Generally, the inspection process is eddy current inspection. After inspection, the sucker rod is shipped to an outside manufacturer 17 in order to forge end pieces on the sucker rod for appropriate applications. Optionally, factory forging 18 may be done wherein the forging is done at the same location as where the rod is heated and shaped.

It should be appreciated by those of skill in the art that the techniques disclosed in the aforementioned embodiments represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit or scope of the invention.

REFERENCES

U.S. Pat. No. 7,985,938
RU 2082590

The invention claimed is:

1. A method for reconditioning a used sucker rod having a given diameter, the method comprising the steps of:
   a. obtaining a used sucker rod having a diameter and a length;
   b. removing contaminates from the surface of the sucker rod;
   c. performing a non-visual inspection of the used sucker rod to determine if the sucker rod is amenable to reconditioning;
   d. categorizing the sucker rod into a steel class;
   e. placing the sucker rod on a conveyor that transports the sucker rod through an induction furnace and heating the rod to a temperature between about 900° C. and about 1300° C. until the rod is able to undergo plastic deformation;
   f. shaping the rod using a pressure machine at a temperature wherein plastic deformation occurs and the conveyor removes the sucker rod from the pressure machine;
   g. cooling the rod;
   h. cutting the sucker rod into a desired length; and
   i. forging ends onto the rod.

2. The method of claim 1, wherein removing contaminates from the surface of the sucker rod comprises: washing the sucker rod with an organic compound, pressure washing the sucker rod, blasting the sucker rod with dry ice, or a combination thereof.

3. The method of claim 2, wherein the organic compound is kerosene.

4. The method of claim 1, wherein performing a non-visual inspection of the used sucker rod comprises performing a magnetic flux leakage inspection of the sucker rod.

5. The method of claim 1, wherein categorizing the sucker rod comprises assigning the sucker rod a steel class of: Class C steel, Class D steel, Class KD steel and High Strength steel.

6. The method of claim 1, wherein shaping the rod decreases the diameter by one standard size, the standard sizes being 1", 7/8", 3/4", and 5/8", and increases the length of the sucker rod.

7. The method of claim 6, wherein upon shaping the rod, the rod has an increased length and the rod is cut into a shorter rod and a pony rod.

8. The method of claim 1, wherein shaping the rod decreases the diameter by more than one standard size, the standard sizes being 1", ⅞", ¾", and ⅝", and increases the length of the sucker rod.

9. The method of claim 8, wherein upon shaping the rod has an increased length and the rod is cut into two rods which are used as sucker rods.

10. The method of claim 1, wherein after shaping the rod, the rod is subjected to shot peening.

11. The method of claim 1, wherein after cutting the rod, the rod is subjected to a final inspection.

12. The method of claim 11, where the inspection is an eddy current inspection.

13. The method of claim 1, wherein the pressure machine performs radial-helical rolling.

\* \* \* \* \*